Nov. 10, 1964  R. SCHNURMANN  3,156,271
FUELING DEVICE
Filed Nov. 2, 1961  2 Sheets-Sheet 1

INVENTOR
RUDOLF SCHNURMANN
BY

ATTORNEY.

Nov. 10, 1964  R. SCHNURMANN  3,156,271
FUELING DEVICE

Filed Nov. 2, 1961  2 Sheets-Sheet 2

INVENTOR
RUDOLF SCHNURMANN
BY
ATTORNEY.

United States Patent Office 3,156,271
Patented Nov. 10, 1964

3,156,271
FUELING DEVICE
Rudolf Schnurmann, Rheydt, Rhineland, Germany, assignor to Scheidt & Bachmann A.G., Rheydt, Rhineland, Germany, a corporation of Germany
Filed Nov. 2, 1961, Ser. No. 149,657
Claims priority, application Germany, May 27, 1961, Sch 29,770
6 Claims. (Cl. 141—210)

The present invention relates to a fueling device in general, and to such fueling device in particular, which is adapted for liquid fuels, the filling hose of which can be connected, in a fluid-tight manner, with the filling pipe of a vehicle tank by means of a coupling, in order to avoid fuel losses due to overflow or spilling of the fluid.

In order to bring about this result, each coupling half is equipped with a valve, which coupling halves, upon joining, are forcibly transformed into their open position, in order to free the flow of fluid from the fueling device into the vehicle tank.

In the co-pending patent application, Serial No. 47,095 to Hans Hoss, filed August 2, 1960, now U.S. Patent No. 3,133,566, an exchangeable intermediate coupling member, operating as an adapter, is provided, in addition to the coupling halves rigidly secured to the filling pipe and the filling hose, respectively, so that in case the filling pipe of the vehicle has a coupling valve, yet the fueling hose of the filling station is not equipped with a corresponding coupling valve, or if one of the two coupling halves, namely either on the filling hose of the filling station, or on the filling pipe of the vehicle tank, is missing, then the exchangeable, intermediate coupling member can be substituted for the missing coupling half on either end.

It is now one object of the present invention to provide a fueling device which includes an appreciable improvement of the coupling arrangement disclosed in said Patent No. 3,133,566, by which it is made possible to simplify appreciably the fluid-tight connection between the fueling hose and the filling pipe of the vehicle tank.

It is another object of the present invention to provide a fueling device, in which a valve housing, disposed at the end of the fueling hose, is surrounded by a bushing rotatable relative to the valve housing, which bushing is equipped with one part of a bayonet closing member, the other part of the bayonet closing member being disposed on the free end of the filling pipe of the tank of the vehicle, and on the inside of the first-mentioned part of the bayonet closing member are provided one or a plurality of arresting members, which, after forming the connection by means of the bayonet closing member, upon further rotation of the bushing, move a cross bolt parallel to itself, both ends of the cross bolt extending into inclined guide grooves of the bushing, whereupon an auxiliary valve secured to the cross bolt and joining its axial movement, is opened against the pressure of a spring from its seat, and, thereby also starts the opening of the main valve.

This embodiment, designed in accordance with the present invention, has at first the advantage, that the hose connection between the fueling device and the filling pipe of the vehicle tank can now be brought about, without exception, with any vehicle, since the one part of the bayonet closing member on the filling pipe of the vehicle tank is of conventional structure and is provided already on the filling pipes on all vehicles and has the conventional design and diameter.

A further advantage of the present invention resides in the fact, that due to the elimination of a particularly exchangeable intermediate coupling member and of a valve in the filling pipe, the coupling device between the filling hose and the filling pipe is appreciably simplified and is also more economical.

It is still another object of the present invention to provide a fueling device wherein a further improvement of the coupling device is brought about in such manner, that it is equipped with a mechanically operating overflow safety device for the tank, whereby the filling operation is automatically stopped at the moment at which the liquid level reaches a height in the tank or in the filling pipe which is arranged at a predetermined level.

It is yet still a further object of the present invention to provide a fueling device, wherein the hose coupling, designed in accordance with the present invention, is equipped with a safety separating device, which, in case of a non-intended, forced separation of the filling hose from the filling pipe, becomes immediately operative.

With these and other objects in view, which will become apparent in the following detailed description, the present invention will be clearly understood in connection with the accompanying drawings, in which:

FIGURE 1 is an axial section of a fueling hose coupling in connection with the filling pipe of a vehicle;

FIG. 2 is a top plan view of the open end of the filling pipe;

FIG. 3 is a fragmentary elevation, partly in section, of the sleeve surrounding the bushing and the valve and control device;

Figure 4:
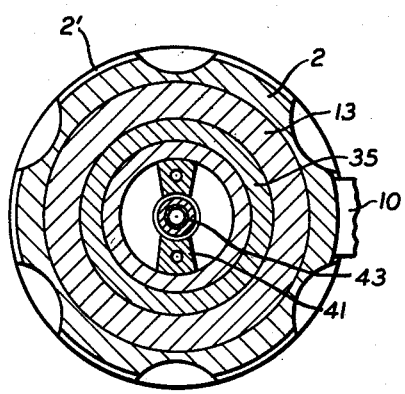
FIG. 4 is a section along the lines 4—4 of FIG. 1.
Figure 5:
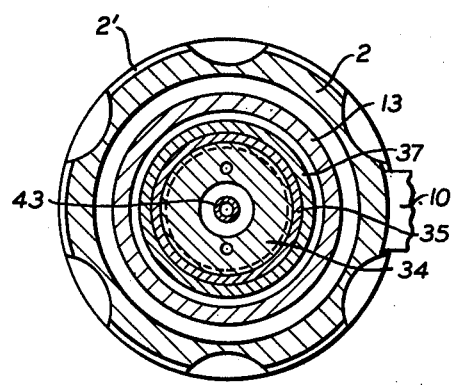
FIG. 5 is a section along the lines 5—5 of FIG. 1.

Referring now to the drawings, and in particular to FIG. 1, a housing 1, which receives the entire valve arrangement and control device, is secured to the free end of a filling hose and is surrounded by a bushing 2. The latter is rotatable about the housing 1 by means of a ball bearing 3 and is widened at its free end to a cylindrical end portion 2', in which a part 6 of a bayonet closing member, provided on a connection or filling pipe 5 of the vehicle tank, is guided cylindrically and is releasably coupled by means of arresting pegs. This coupling arrangement provides a fluid-tight connection of the filling or fueling hose with the filling pipe 5 of the vehicle tank, so that no fuel losses due to spilling or overflowing can take place during the filling of the vehicle tank.

The coupling of the filling hose with the filling pipe 5 of the vehicle tank is made possible, because the bushing 2 is rotatable relative to the filling hose. For this purpose, the upper end of the bushing 2 is equipped with an end member 13, which is formed integrally with the valve- and control-housing 1, and which end member 13 receives at its center a nipple 14 for the filling hose connection. The nipple 14 is sealed against the end member 13 by means of a sealing ring 15 inserted in the end member 13. A ball bearing ring 16 simplifies the rotation of the end member 13 about the nipple 14 for the filling hose connection, upon completing the bayonet joint between the bushing 2 and the filling pipe 5, whereby the valve- and control-housing 1, which is connected with the end member 13, joins the rotation of the bushing 2, due to the friction between these two members.

At the end of the coupling operation, the abutment cams 17 disposed in the bayonet closing member 6 of the filling pipe 5, abut the arresting pegs 19, which are disposed swingably about pivots 20 and disposed adjacent the lower end face 18 of the valve- and control-housing 1, whereby the housing 1 is prevented to continue the previously joint, rotary movement with the bushing 2. As a result of this arrangement, upon continued rotation of the bushing 2, a cross-bolt 22, disposed in an axially oval cross bore 26 of the end member 13, is lifted axially over the entire axial width of the cross bore 26, whereby an auxiliary valve 24 disposed in the valve- and control-housing 1 is opened against the force of a helical spring 25. Both ends of the cross-bolt 22 have pins 23 which enter inclined guide grooves 21 provided in the portion 7 of reduced outer diameter of the bushing 2.

The guide grooves 21, disposed in the portion 7 of the bushing 2, are covered on the outside by means of a sleeve 8, which can slide onto the portion 7 of reduced diameter of the bushing 2, and which sleeve 8 is retained in position by a hand hold 10 swingable about a bolt 12, which is inserted into a flange 9 of the bushing 2, and the hand hold 10 is releasably secured at its other end by means of a screw bolt 11 to an outwardly extending flange 9a of the sleeve 8.

Upon opening of the auxiliary valve 24, the fuel flows from the filling hose through the hose-connecting nipple 14 and the cross bore 26 of the end member 13 into the chamber 27 of the main valve body 35, from which it enters through the bores 28 provided in the cylindrical member 28' into the chamber 29 of the auxiliary valve 24, the opening of which is closed by a closing plate 31.

Upon increase of the fuel pressure, the closing plate 31 is lifted from its seat against the force of the spring 32. The fuel moves now through the chambers 33 and 34 and through the fueling spigot 36 into the filling pipe 5 of the vehicle tank. Since the cross section of the auxiliary valve 24 is greater than that of the bores 28, the pressure in the chambers 29, 33 and 34 is reduced. Since, however, at this time still normal operating pressure prevails in the chamber 27, which pressure acts through slots 37 on the annular face 38 of the main valve body 35, the latter is lifted against the force of the spring 39. The fuel can now flow in full force from the chamber 27 through the housing 1 and the discharge spigot 36 into the fuel tank of the vehicle.

Inside of the main valve body 35 is disposed a Venturi-tube 40 which is axially movable against the force of the spring 44 and which receives continuously the fuel under pressure from the chamber 27 through the bores 41. This fuel leaves the Venturi-tube 40 with great speed and creates a suction, thereby, removing the air present in the chamber 42 which is continuously replaced by means of the thin pipe 43 mounted in the spigot 36.

If, however, at the end of the filling operation, the fluid rising in the filling pipe 5 overflows the opening of the thin pipe 43, no air can be fed anymore into the chamber 42, so that by the effect of the Venturi-tube 40 a pressure below atmospheric pressure is created in the chamber 42. As a result of this development, the hollow piston 45 moves downwardly against the force of the spring 44 and by this movement closes up the lower channel for the flow of the fluid through the chamber 34. No fluid can now escape anymore from the chambers 29, 30 and 33 in front of and behind the auxiliary valve 24 through the chamber 34 into the spigot 36.

The pressure in the chambers 29, 30 and 33 is thereby increased and closes, due to such effect upon the hollow piston 45, the main valve body 35 engaging the hollow piston 45, whereby the filling operation is automatically stopped. The filling hose can now be closed again by a return rotation of the bushing 2, whereby the auxiliary valve 24 is again closed and can also be disconnected from the filling pipe 5 of the vehicle tank.

If, due to neglect by the operator, a vehicle starts moving though the filling pipe of the vehicle is still connected with the filling hose of the fueling device, a safety link is provided on the fueling device to prevent any damage.

This safety link resides in such arrangement, that the arresting pegs 19, provided adjacent the lower end face 18 of the control- and valve-housing 1, are swingably mounted about the pivots 20 against the force of the spring 47 and have an inclined face 46 on their outer side, on which normally the inner edge of the filling pipe 5, constituting one part of the bayonet joint, abuts. Upon exerting a strong pull on the filling hose, the arresting pegs 19 yield inwardly and release thereby momentarily the filling hose.

While I have disclosed one embodiment of the present invention, it is to be understood that this embodiment is given by example only and not in a limiting sense, the present invention being determined by the objects and the claims.

I claim:

1. A fueling device for liquid fuels comprising a filling hose, a housing disposed at and secured to the free end of said filling hose, valve- and control-means disposed in said housing, a bushing surrounding said housing and adapted to be coupled fluid-tight with the filling pipe of a vehicle tank, arresting pegs disposed at the free end face of said housing and adapted to cooperate with abutment members of a bayonet closing member provided on the free end of said filling pipe, in order to secure thereto said housing, said valve- and control-means comprising an auxiliary valve and a main valve disposed in said housing in series in the direction of the flow of said fuel, said housing defining a chamber receiving said main valve, said auxiliary valve having a valve rod extending axially in said housing in a direction opposite to that of the flow of said fuel, said bushing having on its inner face diametrically oppositely disposed, inclined guide grooves, a cross-bolt secured to the free end of said valve rod, the ends of said cross-bolt extending into said inclined guide grooves of said bushing, so that upon relative rotation between said housing and said bushing said cross-bolt is lifted axially in said housing and said auxiliary valve is opened, and means, responsive to the fluid pressure in said chamber for opening said main valve, in order to start the flow of said fuel from said filling hose into said filling pipe.

2. The fueling device, as set forth in claim 1, which includes a pivot secured to said housing adjacent its end face, and said arresting pegs are disposed adjacent the end face of said housing and swingably mounted about said pivot and a pressure spring disposed between said end face of said housing and each of said arresting pegs, said pressure spring maintaining said pressure in operative position.

3. The fueling device, as set forth in claim 1, wherein said arresting pegs have an inclined face at their lower end, adapted to engage the inner edge of said bayonet closing member of said filling pipe, and to yield by swinging about said pivot upon exerting greater axial pulling forces on said filling hose, thereby releasing said filling hose from said filling pipe momentarily.

4. The fueling device, as set forth in claim 1, which includes an end member forming an extension of said housing, a hose-connecting nipple rotatably mounted in said end member, and the latter retaining said hose connecting nipple in operative position.

5. The fueling device, as set forth in claim 4, wherein said bushing extends in an axial direction with respect to said housing to form a portion surrounding said end member, a sleeve surrounding said last-mentioned portion of said bushing and covering said inclined guide grooves, the latter receiving the ends of said cross bolt, a handle pivotally connected at one end to said bushing and said sleeve having a flanged outer extension releasably connected with the other end of said handle.

6. The fueling device, as set forth in claim 1, wherein said main valve includes a Venturi-tube having bores communicating with said main valve, a hollow piston reciprocating axially in said main valve and defining a chamber therein, a helical spring urging said hollow piston into its rearmost position, said hollow piston being adapted to permit removal of air from said chamber by suction, a discharge spigot extending axially from and beyond said housing, to be inserted into said filling pipe, a narrow pipe disposed in said spigot and communicating with said chamber to replace air into said chamber, said replacement of air being stopped upon reaching a fluid level above the end opening of said narrow pipe, thereby causing a pressure below atmospheric pressure in said chamber of said hollow piston, said hollow piston moving against the pressure of said helical spring into closing position upon reaching a predetermined low pressure in said chamber, thereby stopping the flow of fluid through said main valve and discontinuing the filling operation.

References Cited by the Examiner

UNITED STATES PATENTS

| | | | |
|---|---|---|---|
| 2,665,925 | 1/54 | Fraser | 137—614.02 |
| 2,871,894 | 2/59 | Carriol | 141—209 |
| 2,938,550 | 5/60 | Kamm et al. | 141—215 |

LAVERNE D. GEIGER, *Primary Examiner.*